(12) United States Patent
Ucman

(10) Patent No.: US 6,966,539 B2
(45) Date of Patent: Nov. 22, 2005

(54) VALVE SPRING RETAINER (75) Inventor: Robert C. Ucman, Haslett, MI (US)

(73) Assignee: Orchid Orthopedic Solutions, LLC, Holt, MI (US)

( * ) Notice: Subject to any disclaimer, the term of this patent is extended or adjusted under 35 U.S.C. 154(b) by 52 days.

(21) Appl. No.: 10/699,282

(22) Filed: Oct. 31, 2003

(65) Prior Publication Data
US 2005/0092961 A1  May 5, 2005

(51) Int. Cl.$^7$ ................................................. F01L 3/10
(52) U.S. Cl. .................. 251/337; 251/368; 123/90.67; 123/188.12
(58) Field of Search ................................ 251/336, 337, 251/368; 123/90.65, 90.67, 188.12

(56) References Cited

U.S. PATENT DOCUMENTS

| 5,116,430 A | * | 5/1992 | Hirai et al. | .................. 148/518 |
| 5,281,484 A | * | 1/1994 | Tank et al. | .................. 428/552 |
| 5,901,728 A | * | 5/1999 | Hara et al. | ...................... 137/1 |
| 6,004,372 A | * | 12/1999 | Quets | .......................... 75/255 |

FOREIGN PATENT DOCUMENTS

| JP | 08100228 A | * | 4/1996 | ........... C22C 14/00 |
| JP | 10317926 A | * | 12/1998 | ............. F01L 3/10 |

* cited by examiner

Primary Examiner—J. Casimer Jacyna
(74) Attorney, Agent, or Firm—Thompson Hine LLP (57) ABSTRACT A lightweight valve spring retainer with a wear resistant spring seat or seats is provided. The spring seats may be defined in part by a tungsten carbide layer.

22 Claims, 6 Drawing Sheets

VALVE SPRING RETAINER

TECHNICAL FIELD

The present invention relates generally to valve spring retainers used in automobile engines and, more particularly, to a durable valve spring retainer for use in high performance engines such as those used in race cars.

BACKGROUND

Traditional valve spring retainers, such as those used in most automobiles, are made out of steel. In high performance racing (NASCAR, etc.), engine performance is measured in grams of weight removed from the valve train, so valves and spring retainers that are lighter can substantially improve the performance of the engine. Aluminum is generally too soft and not strong enough to be used for valve spring retainers, while steel is generally too heavy. It is known to use titanium as an alloy for valve spring retainers because it is about 40% lighter than steel for comparable strength. However, in high performance racing engines the titanium can gall or wear too easily. For example, in a 500 mile Winston Cup race the wear surface on the retainer can loose up to about 0.060" of material, or installation height, by race end. This loss of material can equate to a 5–10% loss of power in the engine. As races are typically won and lost in the last 25 laps, it is apparent that the valve spring retainer wear can have a significant impact on the success of any racing team or car.

In the past, various attempts to address the wear problem have been made, including attempts to coat the spring seat with a wear resistant coating, having a thickness in the range of about 50–100 millionths of an inch, such as Chrome, Diamond Like Carbon (DLC) using impingement (shot peening), and Titanium Nitride. However, such attempts have not proved especially satisfactory.

Accordingly, it would be desirable to provide a valve spring retainer that is lighter than steel and yet has improved wear characteristics over previously known titanium alloy valve spring retainers.

SUMMARY

In one aspect, a valve spring retainer includes a titanium alloy body portion including an opening therethrough for receiving a valve stem, and at least one step disposed about the opening. A tungsten carbide layer is bonded to the titanium alloy on the step to define, at least in part, a wear resistant spring seat for engaging an end of a spring.

A method of manufacturing a valve spring retainer involves (a) machining a titanium alloy material to produce a retainer body having an opening therethrough for receiving a valve stem, and at least one step disposed about the opening; (b) roughening a portion of the step; (c) applying a tungsten carbide coating to the roughened portion of the step via an HVOF process; and (d) smoothing the tungsten carbide coating to provide a wear resistant spring seat surface on the step.

In another aspect, a valve spring retainer includes a body portion having an opening therethrough for receiving a valve stem, the body portion including at least one step disposed about the opening, the step being of a first material. A coating of a second material is bonded to the first material on the step to define, at least in part, a spring seat for engaging an end of a spring. The second material is more wear resistant than the first material, and the second material is a tungsten carbide material.

DETAILED DESCRIPTION

Figure 1:
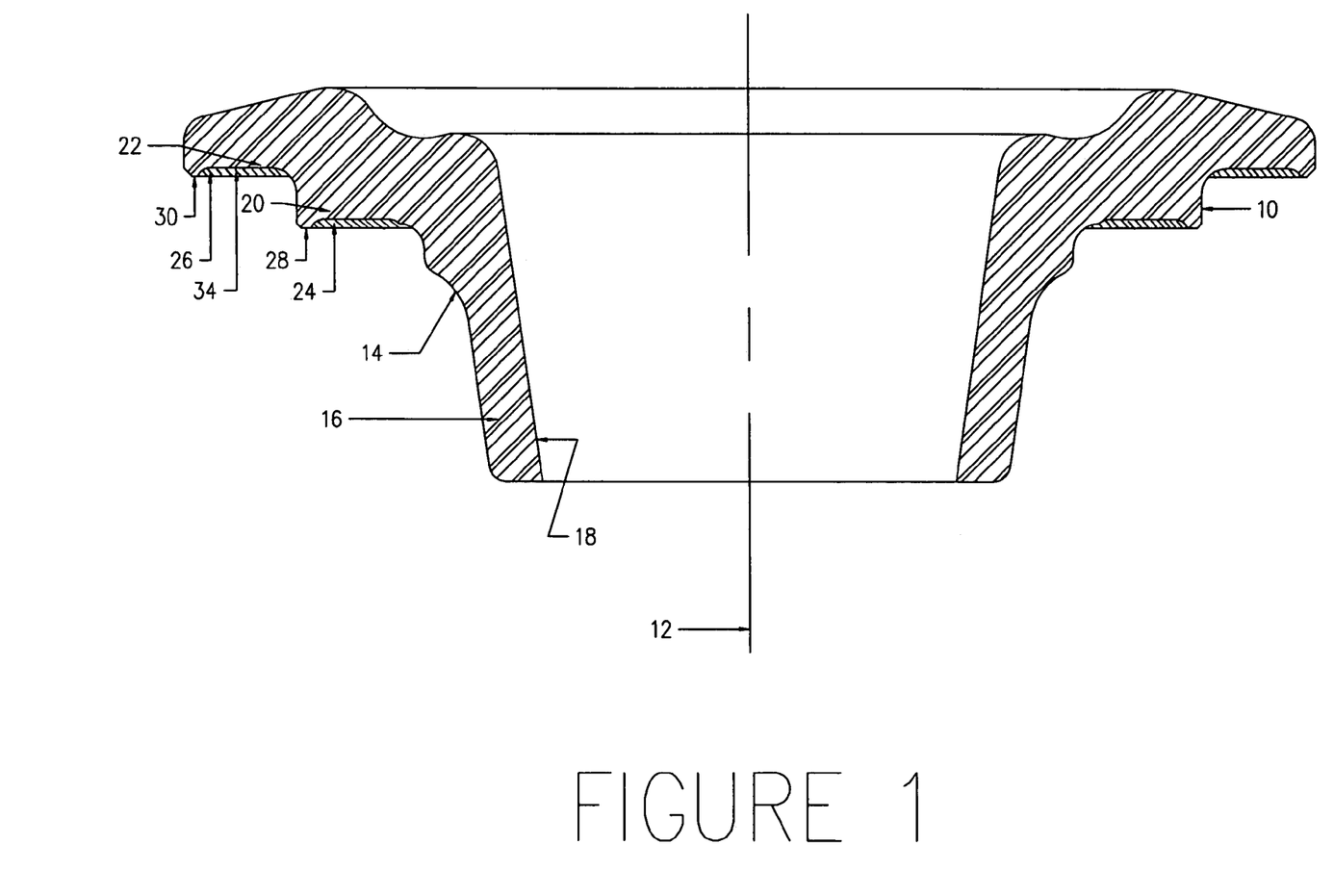
FIG. 1 is cross-sectional view a valve spring retainer.

Referring to FIG. 1, a diametrical cross-section of one embodiment of a partially completed valve spring retainer 10 is shown. The retainer 10 is generally symmetrical about axis 12, and includes a retainer body 14 having a central collet 16 with a through opening 18. The body includes a first annular step 20 disposed about the collet 16 and opening and a second annular step 22 disposed about the first annular step 20. The steps 20 and 22 are at different elevations on the body 14. The body 14 may be formed of a titanium alloy material such as Ti64, Ti62s, Ti17 or Ti11. Another, more wear resistant material, such as tungsten carbide, is provided on each step 20 and 22 as layers or coatings 24 and 26 to define two annular, wear resistant spring seats on the steps.

In the illustrated embodiment the retainer body 14 includes lips 28 and 30 circumscribing the layers 24 and 26 for reducing damage to the outer edge of the tungsten carbide layers during contact by an end of a valve spring. However, it is recognized that embodiments in which the lips 28 and 30 are omitted are possible.

Figure 2:
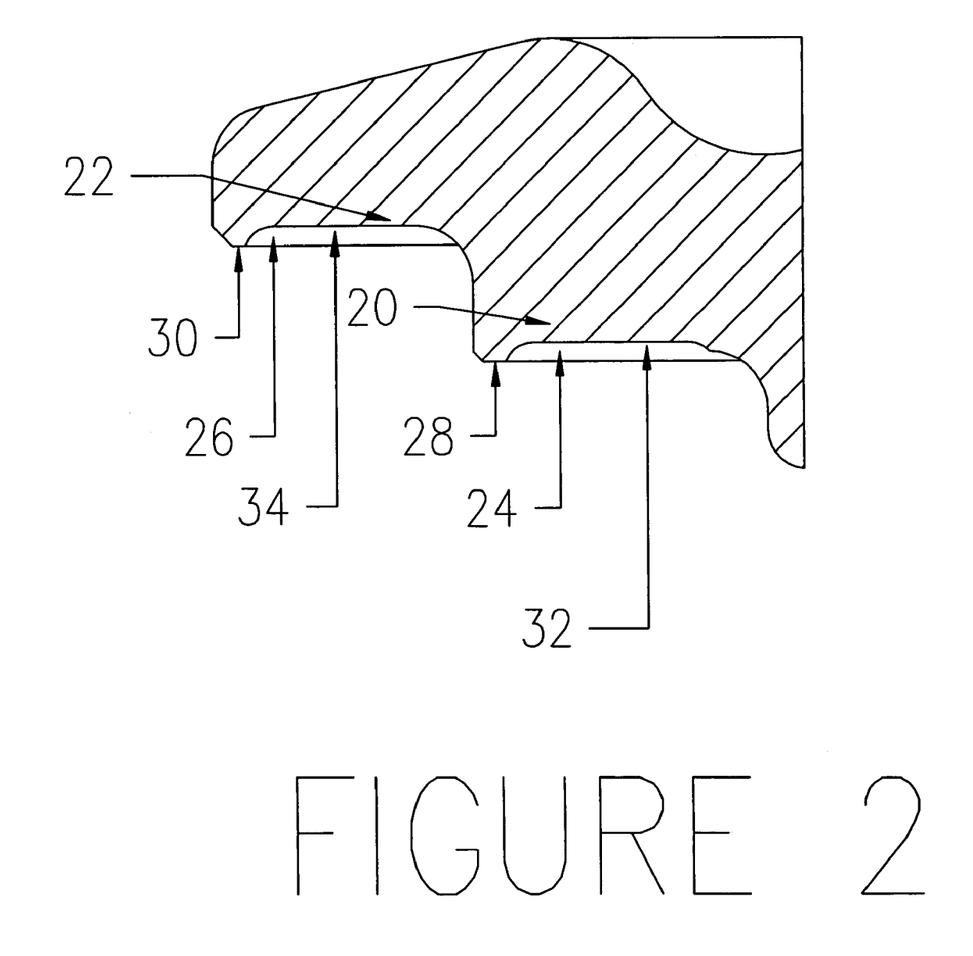
FIG. 2 is a cross-section view of a portion of the body of the retainer of FIG. 1 prior to application of a coating.
Figure 3:
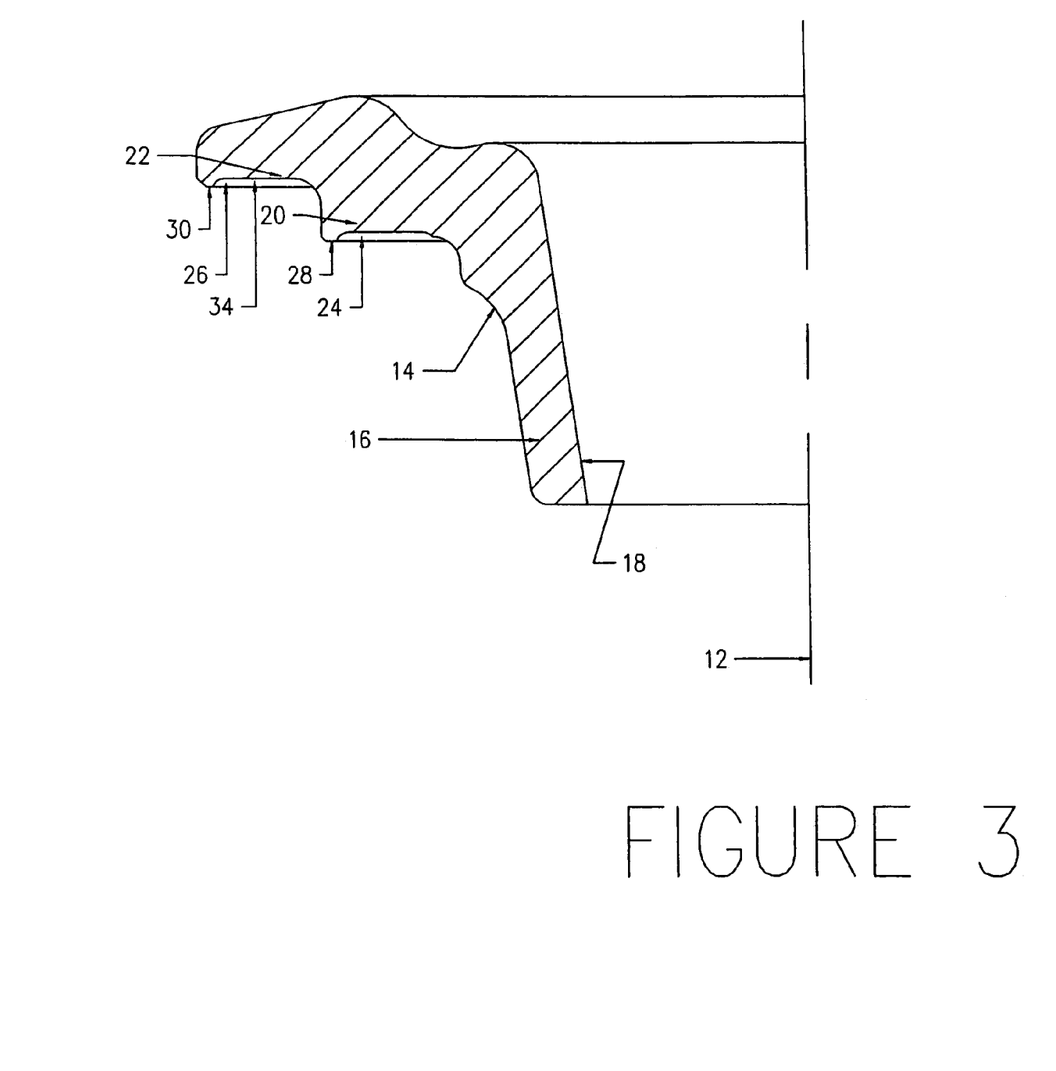
FIG. 3 is a cross-section of the portion of the body of the retainer including the coating.

Referring now to FIGS. 2 and 3, a manufacturing process for the valve spring retainer is described. In particular, a titanium alloy material is machined to produce a retainer body, as partially shown in FIGS. 2 and 3, having opening 18 therethrough for receiving a valve stem, and steps 20 and 22 disposed about the opening 18. CNC machining may be utilized. Undercuts 32 and 34 are machined into the steps 20 and 22 respectively, providing lips 28 and 30 along the outer edges of the steps. The undercuts 32 and 34 are intended to receive the more wear resistant tungsten carbide material. In order to facilitate a better bond between the titanium alloy of the retainer body and the tungsten carbide, the surfaces defining the undercuts 32 and 34 are roughened. By way of example, a media blasting technique may be used to roughen the undercuts. The tungsten carbide coating can then be applied in the undercuts, as by a high velocity oxygen flame (HVOF) coating process. In such a process, an oxygen and fuel combination is used to heat a tungsten carbide powder or wire into molten or near molten form, which is accelerated through a nozzle to a high velocity and is directed onto the surfaces to be coated. In one embodiment, the tungsten carbide material utilized in connection with the HVOF process is Sultzer Metco 5803 reflected in the specification table below:

Sulzer Metco 5803
Chemistry: (WC 12Co) 25(Ni-Based Superalloy)
Particle
Size: −45+11 µm (−325 mesh+11 µm)

Morphology: Blend
Processes: Air Plasma, HVOF,
Properties & Ideal for hard chrome replacement.
Applications: Excellent corrosion resistance and easy machinability. Coatings resist abrasion, fretting and fatigue cracking.

Figure 4:
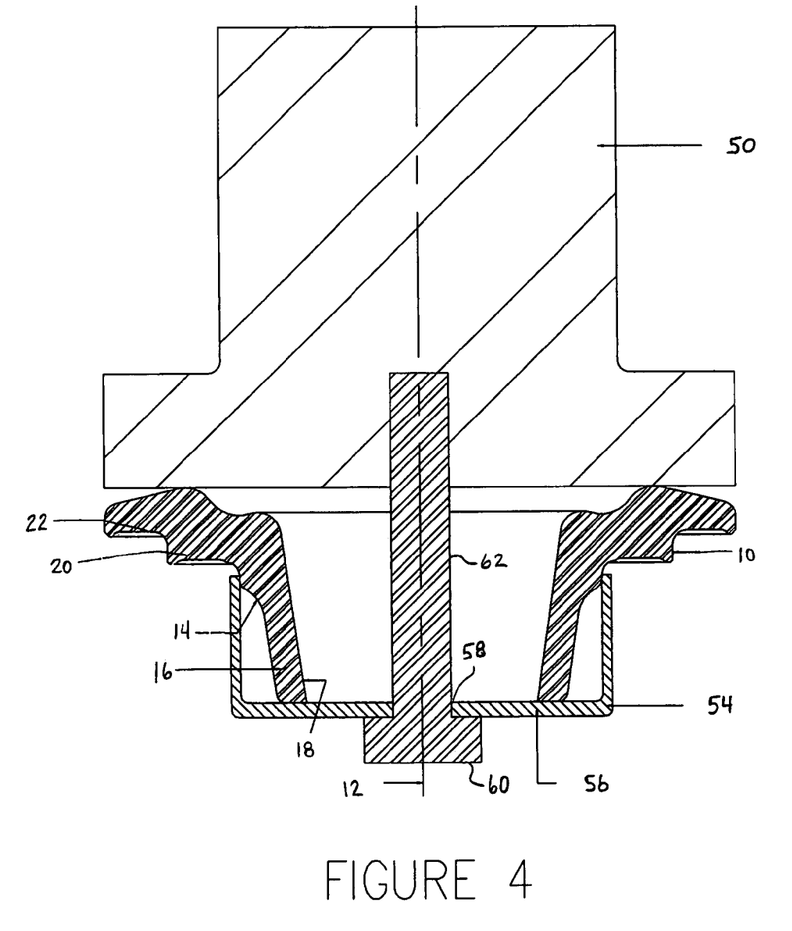
FIG. 4 depicts a retainer fixture that may be used during an HVOF coating process.

It is recognized that other tungsten carbide materials might also be used, and is some cases other materials having suitable wear resistant characteristics might be used in place of tungsten carbide. The retainer 10 may be assembled in a fixture designed to hold the retainer on a spinning disk during the HVOF coating process. Referring to FIG. 4, the fixture may be formed by a cylindrical base 50 to one side of the retainer 10. A brass cap 54 is fitted over the collet to prevent the collet from being coated. A head portion 56 of the brass cap 54 includes an opening 58. A fastening mechanism, such as a bolt 60 with a threaded shaft 62 is positioned against the cap 54 with the shaft 62 threaded into an opening of the base 50. The base can then be held in an opening of a spinning disk and the coating applied to steps 20 and 22 using the HVOF process.

Once the tungsten carbide layers 24 and 26 are applied, they are smoothed to produce the final, wear resistant spring seat surfaces on the steps. The layers may be smoothed to an Ra surface finish of 6 microns or less. In one embodiment, the retainer is spun and ground using a diamond cup wheel, and during the grinding operation the lips 28 and 30 are also ground slightly to provide a smooth transition from the tungsten carbide layers 24 and 26 to the lips 28 and 30. After grinding, the retainer is checked on a height gauge to confirm the tungsten carbide coating thickness and proper install height of the retainer. In an alternative embodiment, the layers may be polished using a CNC lathe machining process with a cubic boron nitride or diamond tipped tool.

In one example, the tungsten carbide layers on the steps are at least about 0.001 inches thick and less than about 0.010 inches thick, and may be between about 0.004 inches and about 0.007 inches, with one preferred thickness being about 0.005 inches. However, it is recognized that embodiments in which the thickness of the tungsten carbide layers are outside these dimensions may be possible.

The resulting retainer, with the tungsten carbide layers on the steps, results in spring seats that are extremely resistant to wear and that will loose little or no installation height over the course of a typical 500 mile Winston Cup race, providing an advantage over engines/cars having retainers that have lost installation height. While the tungsten carbide HVOF process addresses the Wear durability extremely well on a lightweight titanium retainer, it is recognized that other materials might also be suitable to achieve the same or similar results.

Figure 5:
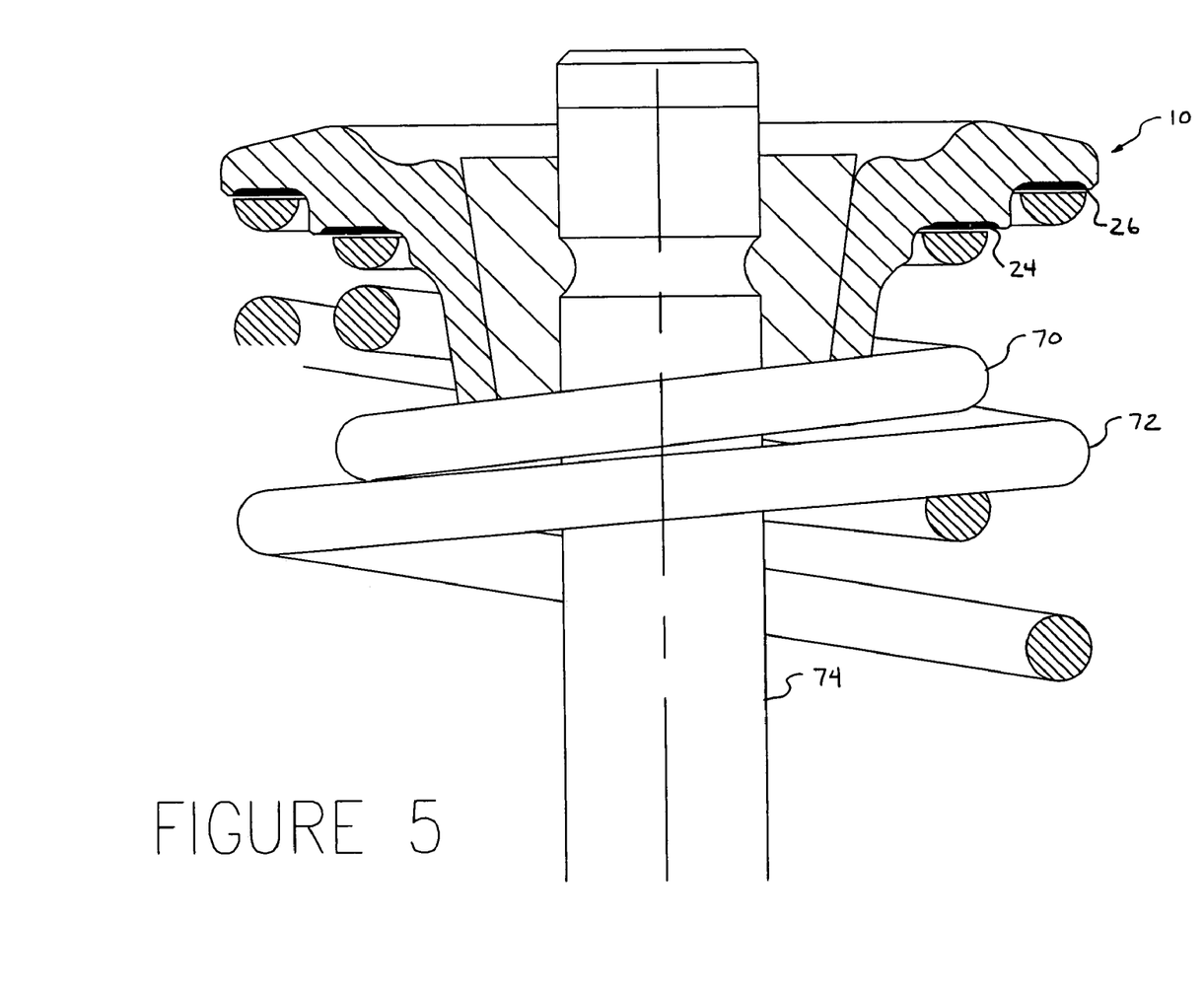
FIG. 5 shows the valve spring retainer of FIG. 1 with associated valve springs and valve stem.

FIG. 5 depicts a valve spring retainer assembly including retainer 10 with a concentric pair of springs 70 and 72 disposed about a valve stem 74 that passes through the retainer 10. Spring 70 includes an end seated against the tungsten carbide layer 26 and spring 72 includes an end seated against the tungsten carbide layer 24. A typical high performance racing engine would include such an assembly for each valve of the engine.

Figure 6:
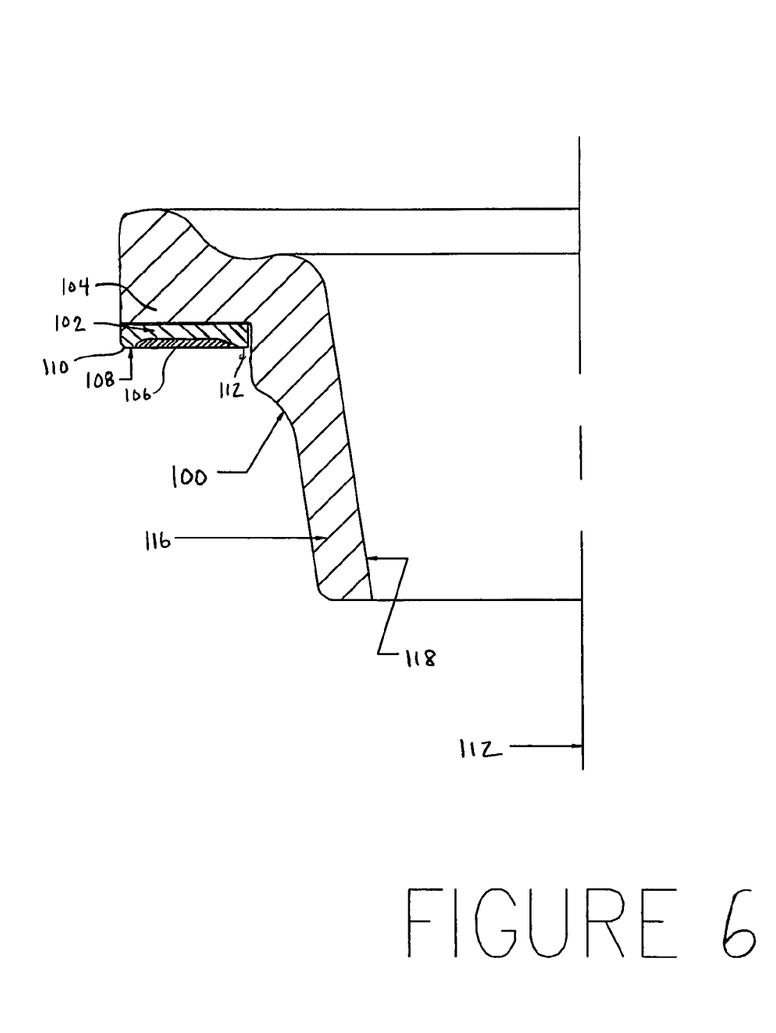
FIG. 6 depicts an embodiment of a valve spring retainer including a shim.

Another embodiment of a valve spring retainer is illustrated in FIG. 6. In this embodiment a portion 100 is made of a titanium alloy and a separate shim (i.e., a piece designed to set the position of the spring seat relative to the retainer body 100) 102 is positioned on a step 104 of part 100 to produce the final elevation of a step of the assembly. Thus, in this embodiment, the retainer body is formed by the combination of part 100 and shim 102. The shim 102 includes a tungsten carbide layer 106 on exposed side 108 to act as the spring seat. In one embodiment, the shim is formed of a steel material, but other, lighter materials could be used. Application of the tungsten carbide layer to the shim may be into an undercut on the shim by the aforementioned HVOF process. In normal operation the shim 102 may be held against the retainer body 100 via the action of the valve spring. The illustrated shim 102 is annular in shape, but variations are possible. The outer and inner edges of the exposed side 108 of the shim 102 can include peripheral lips as shown at 110 and 112, but in other embodiments the lips may be eliminated. Collet 116 and through opening 118 are also shown.

It is to be clearly understood that the above description is intended by way of illustration and example only and is not intended to be taken by way of limitation, and that changes and modifications are possible.

What is claimed is:

1. A valve spring retainer, comprising:
   a titanium alloy body portion including an opening therethrough for receiving a valve stem, and at least one step disposed about the opening;
   a tungsten carbide layer bonded to the titanium alloy on the step to at least in part define a wear resistant spring seat wherein the tungsten carbide layer is surrounded by a titanium alloy lip of the body portion for reducing damage to an outer edge of the tungsten carbide layer during contact by an end of a spring.

2. The valve spring retainer of claim 1 wherein the at least one step comprises a first step disposed about the opening at a first elevation and a second step disposed about the first step at a second elevation, and wherein a first tungsten carbide layer is bonded to the titanium alloy of the first step to define a first wear resistant spring seat and a second tungsten carbide layer is bonded to the titanium alloy of the second step to define a second wear resistant spring seat.

3. The valve spring retainer of claim 1 wherein the titanium alloy comprises Ti 17.

4. The valve spring retainer of claim 3 wherein the tungsten carbide layer is bonded to the titanium alloy of the step via an HVOF coating process.

5. The valve spring retainer of claim 4 wherein the tungsten carbide layer is formed by HVOF application of Sultzer 5803 tungsten carbide powder.

6. A valve spring retainer, comprising:
   a titanium alloy body portion including an opening therethrough for receiving a valve stem, and at least one step disposed about the opening;
   a tungsten carbide layer bonded to the titanium alloy on the step to at least in part define a wear resistant spring seat for engaging an end of a spring, wherein the tungsten carbide layer is applied in an undercut on the step.

7. The valve spring retainer of claim 6 wherein the tungsten carbide layer has a thickness of at least about 0.001 inches.

8. The valve spring retainer of claim 7 wherein the thickness of the tungsten carbide layer is at least about 0.004 inches.

9. A valve spring retainer assembly incorporating the valve spring retainer of claim 1, the assembly comprising:
   at least one valve spring positioned with one end against the wear resistant spring seat of the valve spring retainer.

10. A high performance engine, comprising:

at least one valve associated with the valve spring retainer assembly of claim 9.

11. A valve spring retainer, comprising:

a body portion having an opening therethrough for receiving a valve stem, the body portion including at least one step disposed about the opening, the step being of a first material;

a coating of a second material bonded to the first material on the step to define, at least in part, a spring seat for engaging an end of a spring;

wherein the second material is more wear resistant than the first material, and the second material is a tungsten carbide material, wherein the second material is applied in an undercut on the step.

12. The valve spring retainer of claim 11 wherein the body portion is formed by a unitary body in combination with a shim member adjacent the unitary body, the shim member in part defines the stop.

13. The valve spring retainer of claim 12 wherein the shim is of the first material and the unitary body is of a third material.

14. The valve spring retainer of claim 11 wherein the body portion, including the step, is a unitary member of the first material.

15. The valve spring retainer of claim 11 wherein a surface defining the undercut is roughened to facilitate bonding with the second material.

16. The valve spring retainer of claim 11 wherein the second material has a thickness of at least about 0.001 inches.

17. The valve spring retainer of claim 11 wherein the second material has a thickness or at least about 0.004 inches.

18. A valve spring retainer, comprising:

a body portion having an opening therethrough for receiving a valve stem, the body portion including at least one step disposed about the opening, the step being of a first material;

a coating of a second material bonded to the first material on the step to define, at least in part, a spring seat for engaging an end of a spring;

wherein the second material is more wear resistant than the first material, and the body portion includes a lip that extends around the coating of the second material to reduce damage to an outer edge of the coating of the second material during contact by an end of a spring.

19. The valve spring retainer or claim 18 wherein the second material has a thickness of at least about 0.001 inches.

20. The valve spring retainer of claim 19 wherein the second material has a thickness of at least about 0.004 inches.

21. The valve spring retainer of claim 18 wherein the second material is applied in an undercut on the step.

22. The valve spring retainer of claim 18 wherein a surface defining the undercut is roughened to facilitate bonding with the second material.

* * * * *

UNITED STATES PATENT AND TRADEMARK OFFICE
CERTIFICATE OF CORRECTION

PATENT NO. : 6,966,539 B2  
DATED : November 22, 2005  
INVENTOR(S) : Robert C. Ucman It is certified that error appears in the above-identified patent and that said Letters Patent is hereby corrected as shown below:

Column 4,  
Line 46, change "Sultzer" to -- Sulzer --.

Column 5,  
Line 19, change "stop" to -- step --.

Column 6,  
Line 2, change "or" to -- of -- before "at".  
Line 18, change "or" to -- of -- before "claim 18".

Signed and Sealed this

Seventh Day of February, 2006

JON W. DUDAS  
*Director of the United States Patent and Trademark Office*